United States Patent Office 2,885,435
Patented May 5, 1959

2,885,435

HYDROLYTIC DECYANOETHYLATION OF N,N-BIS (2-CYANOETHYL) AMIDE COMPOUNDS

Laurence A. Pursglove, Midland, Mich., assignor to The Dow Chemical Company, Midland, Mich., a corporation of Delaware No Drawing. Application August 13, 1956
Serial No. 603,838

11 Claims. (Cl. 260—518)

The present invention is concerned with the hydrolytic decyanoethylation of N,N-bis (2-cyanoethyl) amide compounds having the general formula:

wherein R is selected from the group consisting of alkyl, aryl, haloaryl and nitroaryl radicals and (G) is selected from the group consisting of the bivalent —CO— and —SO$_2$— radicals.

It is the object of the invention to provide a novel method for the simultaneous hydrolysis and decyanoethylation of compounds of the indicated variety in order to prepare either N-substituted-β-carbamoylethyl amide compounds or N-substituted-β-alanine compounds, or both, that may be respectively represented by the following structural formulae:

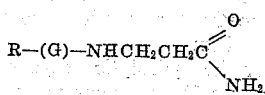

and R—(G)—NHCH$_2$CH$_2$COOH, wherein both R and (G) are the same as described in the foregoing. The products that may be obtained in the practice of the present invention may find application for a wide variety of purposes. Among other utile characteristics, for example, they frequently have biochemical value as either fungicides, herbicides, insecticides, nemacides, or the like, depending upon their individual properties and capabilities.

According to the invention, N,N-bis (2-cyanoethyl) amide compounds of the indicated variety may advantageously be hydrolytically decyanoethylated by a method which comprises subjecting the starting amide compound, while it is dissolved in a suitable solvent and in the presence of water, to a strong basic catalyst. It is believed that the reactions which occur may be illustrated in the following manner:

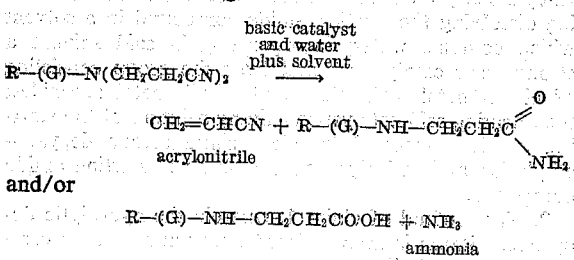

The type of final product that is obtained, i.e., either an N-substituted-β-carbamoylethyl amide compound or an N-substituted-β-alanine acid compound, or both, depends upon the amount of water that is present in the reaction mass. When mere traces of moisture are involved, it is usually possible either to isolate as a product the substantially pure N-substituted-β-carbamoylethyl amide compound or to obtain it in a mixture with an unhydrolyzed but decyanoethylated N-(2-cyanoethyl) amide compound. When the quantity of water that is present is increased up to an equimolar proportion with the starting N,N-bis(2-cyanoethyl) amide compound, increasingly greater proportions of the N-substituted-β-alanine acid compound are ordinarily obtained in a mixed product with the N-substituted-β-carbamoylethyl amide compound in which certain proportions of the unhydrolyzed but decyanoethylated amide compound may also be present. Mixed products comprised of still greater proportions of the N-substituted-β-alanine acid compound may usually be obtained by increasing the amount of water that is present in the reaction mass to a quantity that is equal to or in excess of the amount that is theoretically required to effect the complete hydrolysis of the starting material to the acid. In many instances a substantial excess of water over the theoretically required quantity may be necessary to obtain the entire product as the N-substituted-β-alanine acid derivative. When it is desired to obtain the acid derivative compound as substantially the sole product, it may oftentimes be especially advantageous to conduct the reaction in an essentially aqueous medium in which water is the solvent for the starting N,N-bis (2-cyanoethyl) amide compound to be hydrolytically decyanoethylated. Thus, the presence of sufficient water for complete and efficient hydrolysis of the starting amide may be assured.

While the hydrolytic decyanoethylation of the invention may be practiced under varying conditions, it is usually an advantage for it to be conducted under atmospheric pressure at ebullient temperatures while refluxing the solvent that may be evaporated during the course of the reaction. Ordinarily, the reaction may be thus accomplished or satisfactorily terminated within 2 to 3 hours and, in many instances, may be completed in shorter periods of time.

The particular selection that is made from the indicated group for the radical R is relatively immaterial insofar as the realization of good results in the practice of the invention is concerned. Likewise, equivalent good results are generally obtainable when (G) is either the —CO— or —SO$_2$—radical so that the composite arrangement R(G)— is actually either an acyl or sulfonyl type of group. Examples of composite R(G)— constituents that may be present with especial benefit in the starting amide compound being hydrolytically decyanoethylated include acetyl groups, CH$_3$CO—; ortho-chlorobenzoyl groups, o-ClC$_6$H$_4$CO—; para-chlorobenzoyl groups, p-ClC$_6$H$_4$CO—; para-nitrobenzoyl groups, p-NO$_2$C$_6$H$_4$CO—; phenylsulfonyl groups, C$_6$H$_5$SO$_2$—; and para-chlorophenylsulfonyl groups, p-ClC$_6$H$_4$SO$_2$—.

The strong basic catalyst that is employed for accomplishing the hydrolytic decyanoethylation may advantageously be an alkali metal hydroxide or alkoxide compound. Better results may frequently be experienced with alkali metal alkoxides, such as sodium ethoxide and the like, especially when they contain not more than four carbon atoms in the alkyl portions of their molecules. For most of the reactions, little criticality is involved in the amount of catalyst that is employed, so long as it is present in the reaction mass in greater than trace proportions. It may often be desirable, however, to employ at least about 0.5 mole percent of catalyst, based on the quantity in the reaction mass of the N,N-(2-cyanoethyl) amide compound that is being hydrolytically decyanoethylated. When acidic products are being prepared, however, it is usually necessary to employ a sufficient quantity of the catalyst, as an amount that is at least about equimolar with the reactants, in order to prevent its complete destruction during the reaction.

Any suitable solvent may be utilized as the medium in which the hydrolytic decyanoethylation is accomplished. As mentioned, water may be preferable when complete hydrolysis to the acid product is desired. However, excellent results, especially when only partial hydrolysis is involved, may also be obtained with water miscible polar solvents such as low molecular weight aliphatic alcohols (including ethanol, propanol and butanol), ethylene glycol and pyridine and the like. In certain instances, however, non-polar hydrocarbon solvents which do not have an especial affinity for water, such as benzene, may be utilized, especially when an alkoxide catalyst is employed or when the hydrocarbon solvent contains traces of a water miscible polar solvent, as benzene containing very slight proportions of an ethanol-water mixture. The water that is present in the reaction mass need not be dissolved in the solvent (although it is ordinarily more advantageous when such is the case) but may be intimately dispersed therethrough according to known techniques. Generally, the amount or proportion of the solvent that must be employed should suffice to maintain in solution the starting amide compound being hydrolytically decyanoethylated during the reaction. Solutions that are at or near saturation may usually be used with benefit.

The desired product, either an N-substituted-β-carbamoylethyl amide compound or an N-substituted-β-alanine acid compound, or mixtures thereof, may be recovered readily by recrystallization techniques after removing the solvent, either by evaporation or filtration, from the reaction mass upon termination of the reaction. In some cases it may be desirable to neutralize excess quantities of the catalyst that may be present in the reaction mass before isolating the product. The crude product or mixture of products in the reaction mass may ordinarily be obtained in substantial yields (that generally are at least about 50 percent and frequently may be essentially quantitative) from the starting N,N-bis (2-cyanoethyl) amide compound that is being hydrolytically decyanoethylated. After its ultimate recovery by recrystallization or as otherwise desired, the purified product is generally obtainable in yields that are ordinarily at least as high as 30 percent and which frequently may be considerably greater, as in the neighborhood of 75–80 percent, or higher.

Further illustration of the invention is provided in and by the following examples.

Example 1

About 0.2 gram of metallic sodium that was contained in about 20 milliliters of normal butanol was added to a solution of about 45.4 grams (0.2 mole) of N,N-bis (2-cyanoethyl) benzamide in about 400 milliliters of moist normal butanol at a temperature of about 80° C. The reaction mass was heated at a temperature that was maintained between about 80 and 90° C. for a period of time of about 3 hours. At the end of this period, the reaction mass was placed under an absolute pressure between about 260 and 290 millimeters of mercury, while maintaining the reaction temperature, until about 200 grams of the solvent was distilled off. The residue was then cooled and about 21.5 grams of a precipitate, melting between about 140 and 150° C., was recovered. Recrystallization of the crude precipitate, initially from about 100 milliliters of water and subsequently from about 50 milliliters of water, produced about 10 grams of a white crystalline material having a melting point between about 160 and 165° C. The finally purified product was identified as being comprised essentially of N-(2-carbamoylethyl) benzamide.

Example 2

The procedure of the first example was repeated excepting to employ about 0.5 gram of potassium hydroxide dissolved in about 35 milliliters of 95 percent ethanol as the catalyst and to replace the butanol solvent with about 400 milliliters of 95 percent ethanol. About 40 grams of product was obtained which consisted essentially of a mixture of about equal parts by weight of N-(2-cyanoethyl) benzamide and N-(2-carbamolyethyl) benzamide.

Example 3

About 27 grams (0.09 mole) of p-chloro-N,N-bis (2-cyanoethyl) benzenesulfonamide was added to a solution of about 2 moles of sodium hydroxide in 720 milliliters of water. The addition was performed at a temperature of about 50° C. The mixture was then refluxed for about five hours during which time the surface of the reaction mass was swept with a stream of nitrogen in order to assist in removal of the ammonia. After this period, the reaction was terminated and the reaction mass cooled to a temperature of about 20° C. About 2 moles of a 5 N aqueous solution of hydrochloric acid was added, with vigorous agitation, to the cooled reaction mass. About 23.5 grams of a crude precipitate melting between about 145 and 153° C. was recovered. The initial precipitate was recrystallized from about 600 milliliters of water to provide about a 75 percent yield (17.5 grams) of N-(p-chloro-phenyl-sulfonyl)-β-alanine.

In a representative operation, the N-(p-chlorophenyl-sulfonyl)-β-alanine product that was obtained gave complete controls of the growth of the organisms *Salmonella typhosa* and *Staphylococcus aureus* on agar culturing media that had been saturated with the product β-alanine compound.

Similar results may be obtained when the foregoing procedures are repeated with other of the mentioned catalysts and solvents in order to hydrolytically decyanoethylate such starting amides as o-chloro-N,N-bis (2-cyanoethyl) benzamide; p-chloro-N,N-bis (2-cyanoethyl) benzamide; p-nitro-N,N-bis (2-cyanoethyl) benzamide; N,N-bis (2-cyanoethyl) acetamide and the like.

What is claimed is:

1. Method for the hydrolytic decyanoethylation of an N,N-bis (2-cyanoethyl) amide compound having the general formula: R—(G)—N(CH₂CH₂CN)₂, wherein R is selected from the group consisting of alkyl, aryl, haloaryl and nitroaryl radicals and (G) is selected from the group consisting of the bivalent —CO— and —SO₂— radicals in order to prepare a hydrolyzed product selected from the group consisting of N-substituted-β-carbamoylethyl amide compounds, N-substituted-β-alanine compounds and mixtures thereof, said product compounds being represented respectively by the formulae:

and R—(G)—NHCH₂CH₂COOH, wherein both R and (G) have the same meanings as in the starting N,N-bis (2-cyanoethyl) amide compound, said method comprising dissolving the starting amide compound in a solvent which contains water; incorporating in said solvent a strong basic catalyst selected from the group consisting of alkali metal hydroxides and alkali metal alkoxides; then heating said catalyst-containing solution of the starting amide compound to effect simultaneous decyanoethylation and hydrolysis of the dissolved starting amide compound.

2. The method of claim 1, wherein the hydrolytic decyanoethylation is accomplished under atmospheric pressure and at the boil.

3. The method of claim 1, wherein the strong basic catalyst is an alkali metal hydroxide.

4. The method of claim 1, wherein the strong basic catalyst is an alkali metal alkoxide.

5. The method of claim 1, wherein the strong basic catalyst is an alkali metal alkoxide that does not contain more than 4 carbon atoms.

6. The method of claim 1, wherein the solvent is a polar solvent that contains water.

7. The method of claim 1, wherein the solvent is a low molecular weight aliphatic alcohol that contains water.

8. The method of claim 1, wherein the solvent is moist butanol.

9. The method of claim 1, wherein there is an insufficient quantity of water present to completely hydrolyze the starting amide to the β-alanine acid product and wherein the product consists predominantly of the N-substituted-β-carbamoylethyl amide compound.

10. The method of claim 1, wherein the solvent is essentially water and the product consists substantially completely of the N-substituted-β-alanine compound.

11. The method of claim 1, wherein the solvent is 95 percent ethanol.

References Cited in the file of this patent

UNITED STATES PATENTS

| | | |
|---|---|---|
| 2,401,429 | Kung | June 4, 1946 |
| 2,424,664 | McQueen | July 29, 1947 |
| 2,461,842 | Olin | Feb. 15, 1949 |

OTHER REFERENCES

Whitmore et al.: Jour. Am. Chem. Soc., vol. 66, p. 725 (1944).

Bruson: Organic Reactions, vol. V, pp. 83–84 (1949).

Wagner et al.: Synthetic Organic Chemistry, pp. 412–415 (1953).